Dec. 8, 1942.　　J. BERGHOLM　　2,304,140
GAS GRIDDLE
Filed Jan. 20, 1940　　2 Sheets-Sheet 1
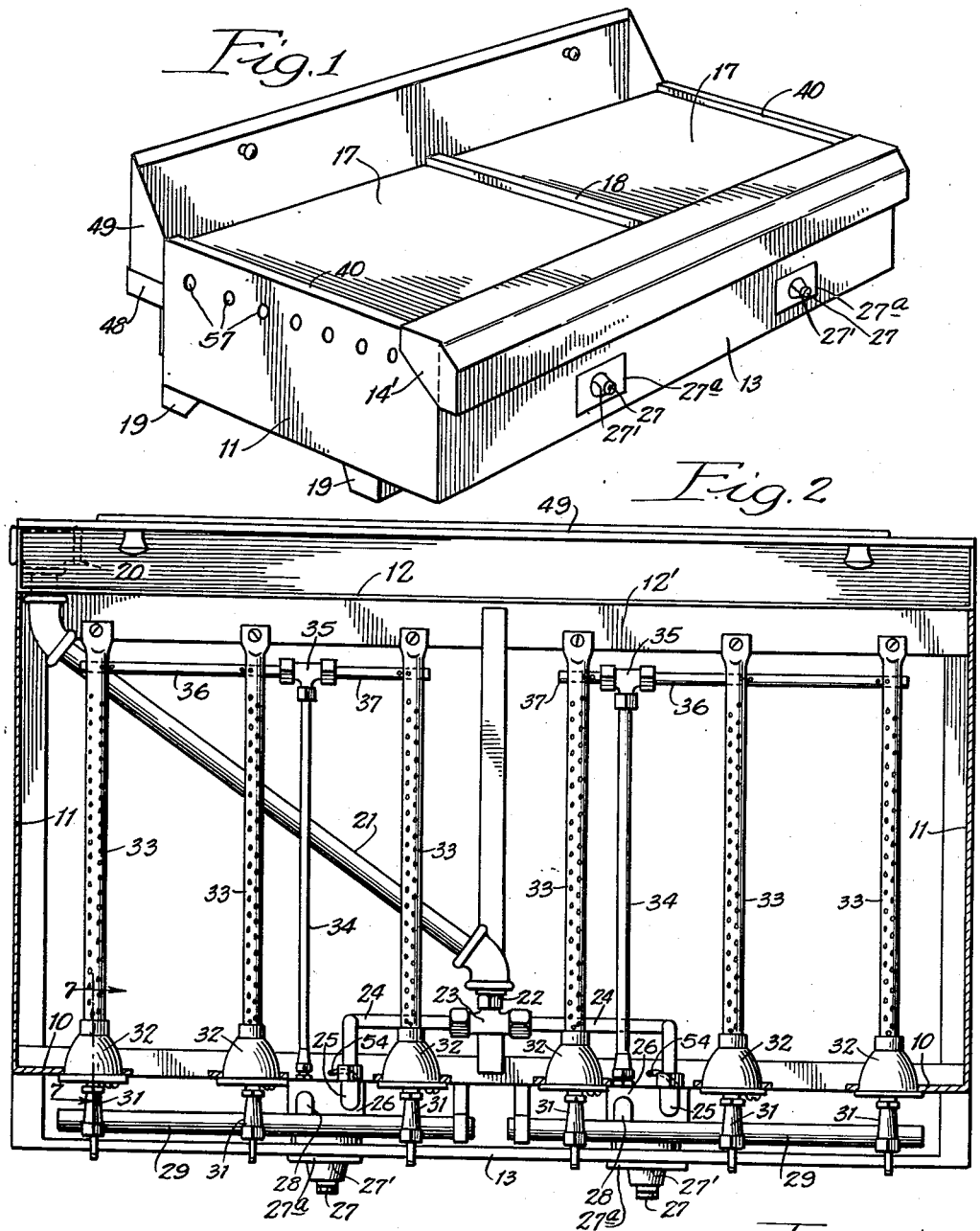
Inventor:
John Bergholm,
By Fisher, Clapp, Soans & Pond
Attorneys.

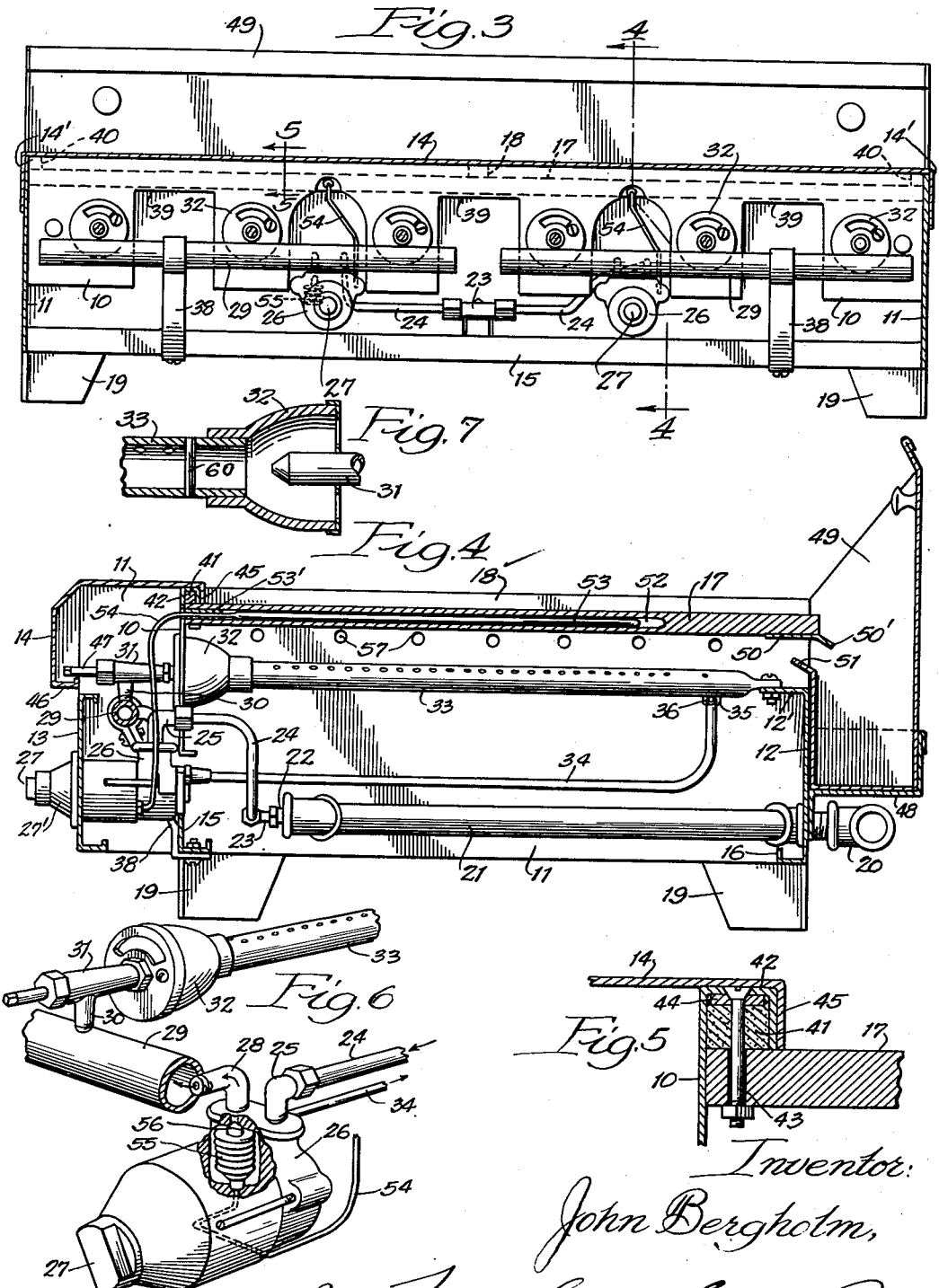
Dec. 8, 1942.     J. BERGHOLM     2,304,140
GAS GRIDDLE
Filed Jan. 20, 1940     2 Sheets-Sheet 2
Inventor:
John Bergholm,
By Fisher Clapp Soans & Wood
Attorneys.

Patented Dec. 8, 1942

2,304,140

UNITED STATES PATENT OFFICE 2,304,140

GAS GRIDDLE

John Bergholm, Chicago, Ill.

Application January 20, 1940, Serial No. 314,785

1 Claim. (Cl. 126—39)

This invention relates to gas griddles of a type extensively used in restaurants, hotels, drug stores, etc., where food is prepared; and the general object of the invention is to produce a griddle of this type of neat and attractive appearance, durable and compact construction, and efficient and satisfactory in service wherever employed.

Other more specific objects are, to provide an improved griddle of the kind mentioned having both automatic and manually-controlled means for the frying, cooking and heating of foods, to provide a griddle of this type with improved means by which the grill top temperature is caused to act on the gas supply, resulting in a prompt response of the thermostat to balance the temperature of the grill top plate with the temperature setting on the thermostat dial, to provide a griddle which may conveniently be assembled in one, two or more laterally adjacent sections, any or all of which may be in use at the same time, to provide a multiple grid grill wherein one grid may be gas heated for cooking and an adjacent grid may be heated by conduction from the gas heated grid for the purpose of keeping previously cooked food hot until served, and to provide a griddle wherein the burners, thermostats, air and gas leads, and other operating parts are entirely enclosed and concealed, thereby effecting a low cost of operation and insuring greater safety to the user, as well as presenting a neat and pleasing appearance.

Still other objects and attendant advantages of the invention will be apparent to persons skilled in the art from the following detailed description of an illustrative embodiment thereof shown in the accompanying drawings, in which—

Fig. 1 is a perspectitve view of a twin griddle as seen from the front.

Fig. 2 is a top plan view with the heating plate and front cover removed to disclose underlying parts, and with the side walls in horizontal section.

Fig. 3 is a front elevation, with the upper panel of the front wall removed and the front cover in vertical longitudinal section.

Fig. 4 is a front-to-rear vertical section, taken on the line 4—4 of Fig. 3.

Fig. 5 is an enlarged sectional detail, taken on the line 5—5 of Fig. 3.

Fig. 6 is a perspective elevation, showing the thermostat and the parts leading thereto and served thereby.

Fig. 7 is a section on line 7—7 of Fig. 2.

The rectangular housing of the griddle comprises a front panel 10, side panels 11, back panel 12, a front thermostat panel 13, and a front cover 14. The side panels 11 are connected and spaced at their lower corners by front and rear channels 15 and 16 (Fig. 4), the latter of which may be an integral extension of the back panel 12. A heavy steel plate 17 constitutes the top heating plate of the griddle. It will be observed by reference to Figs. 1 and 4 that the plate 17 is countersunk slightly below the upper edges of the side walls 11 and cover 14, and its rear end overhangs the upper end of the back panel 12.

The griddle herein shown is a twin griddle, and the top heating plate 17 is preferably made as a single horizontal plate of uniform thickness, one half of which serves one griddle and the other half serves the other, a spacing bar 18 separating their top surfaces. The structure is supported on four legs 19, which are attached to the side panels 11, back panel 12 and cross channels 15 and 16.

In Fig. 2 is shown a gas supply T 20 which is connected through the back panel 12 with an oblique gas supply pipe 21. A reducer 22 connected to the delivery end of pipe 21 and into a T 23 divides the gas flow, in the case of a twin griddle burner assembly, into two streams flowing in opposite directions through tubes 24 which, in turn, have their terminals in L's 25 which are tapped into thermostat bodies 26 that are mounted in the thermostat panel 13. The thermostats 26 are of a known commercial structure and by their use the amount of gas to be released to the burner or burners at any given time is determined automatically. The burner may also be manually set to yield a desired degree of heat by a knob 27 on the front end of the thermostat body that projects through the front wall panel 13 and cooperates with a dial 27' mounted on plate 27ª. The gas released from the thermostat flows through an L 28 into a gas header manifold 29, two such manifolds being shown in Figs. 2 and 3, one serving one half of the griddle plate 17 and the other serving the other half. Referring to Figs. 4 and 6, from each manifold 29 rise short tubes 30, each of which connects into a horizontal tube 31 that supplies gas to the usual bell-shaped air and gas mixer 32 on the front end of a burner tube 33 that underlies the heating plate 17. The rear end of each burner tube 33 is supported upon and bolted to a flange 12' on the upper end of the rear panel 12 of the housing (Fig. 4).

Underlying each half of the burner plate 17, I have herein shown three straight parallel burner tubes 33; and associated with each group of burners is a pilot consisting of a tube 34 which receives its gas supply from a thermostat 26 and at its rear end connects into a T 35, from which extend branch pilot tubes 36 and 37 underlying the rear ends of a group of burner tubes.

Each gas header manifold 29 is conveniently supported by brackets 38 (Fig. 3) bolted at their lower ends to the channel 15.

The front panel 10 has a plurality of sizeable openings 39 (Fig. 3) permitting access of free air to the combustion chamber under the plate 17; and ready access to the burners 33 and pilot tubes 34, 35, 36 and 37 is obtainable through these openings.

Each of the side walls 11, which is preferably made integral by means of welding with the front panel 10 and the thermostat panel 13, is formed with an inverted channel top edge 40 (Fig. 1) which is fitted to the top of plate 17, and made tight on the plate by means of a cement filling such as 41. The front panel 10 is likewise provided with an inverted channel top edge 42 (Fig. 5) packed with cement filling 41. This prevents grease on the plates 17 running off at the front and side edges. The front end of plate 17 is secured in place, as shown in Fig. 5, by bolts 43 which extend through the plate 17, the filling 41, a metal covering strip 44 overlying the filling 41, and the top wall of the inverted channel 42, the head of the bolt being countersunk in the latter. This construction provides grease-tight joints at the front and sides of the cooking plate 17.

The cover member 14 has its top wall formed with a downwardly bent flange 45, which hooks over the inverted channel 42, as shown in Figs. 4 and 5; the top wall of the cover 14 resting on the forward upper edges of the side panels 11, and its lower edge having an inwardly directed flange 46 that abuts against the front edges of the side walls, as shown in Fig. 4. On the ends of the cover member 14 are transverse flanges 14' (Fig. 1) that overlap the upper front corners of the side panels 11. This cover member 14 is readily removable to permit access to the stems 47 (Fig. 4) of the gas cocks of the burners. Griddles of this type are in service all day and most of the night, so that the gas is ordinarily turned on and shut off but once in twenty-four hours, and that can be accomplished handily by slightly tilting up the cover 14.

At the rear end of the griddle is a U-shaped holder 48 in which is mounted a removable basin 49 for catching grease running off the rear end of plate 17 and guided into the pan by a drip edge 50' on a cross bar 50 that supports the rear edge of plate 17. The inner wall of the basin 49 is formed with a back splash and grease deflector plate edge or flange 51.

In each section of the griddle top plate 17 is a longitudinal bore 52 (Fig. 4), in which is inserted a thermostat bulb 53. The bulb 53 is filled with an expansible liquid and its forward end is continuous with a reduced pipe pline 54 that extends through a cement packing 53' down into the thermostat casing 26 and communicates with the lower end of a bellows 55 (Fig. 6), which latter in turn actuates a valve 56 that controls the outflow of gas through the L 28. As the heat of plate 17 increases, the outflow of gas to the underlying burners is restricted; and as the temperature of the plate falls, the reverse action takes place, the valve 56 is opened, and more gas is supplied to the burners. By this device the temperature of the plate 17 is maintained substantially constant at the figure shown by the thermostat dial; but this constant can be increased or diminished by manual manipulation of the dial knob 27 of the thermostat.

By making the two grid sections of the top griddle plate 17 in a single integral plate of heat-conducting material such as steel, an important functional advantage is secured in a multiple plate griddle such as that herein shown. By lighting the burners of one section of the plate, the food may be cooked. The other section of the plate is heated by conduction from the cooking plate and without igniting its underlying burners, and it thus serves as a receptacle for the food cooked on the live burner plate to keep the cooked food hot until it is served.

The gas and air mixture delivered under pressure to the burner tubes 33 sometimes floods the latter unevenly, causing the rear and intermediate jets to burn to the exclusion of the forward jets. This is due to a non-uniform distribution or dispersion of the fuel throughout the full length of the tube. I have found that this condition may be remedied by inserting a pin 60 (Fig. 7) across the receiving end of the tube, which divides and spreads the inflowing current of fuel uniformly throughout the interior of the tube.

The combustion gases escape readily to the atmosphere through vent holes 57 in the side panels 11, and the space between the flange 12' on the top edge of rear panel 12 and the griddle plate 17.

It will be obvious that various immaterial changes and modifications may be made in the device shown and described without departing from the spirit of the invention or sacrificing any of the advantages thereof. Hence, I do not limit the invention to the exact form, construction, arrangement and combination of parts herein described, except to the extent clearly indicated in the specific claim.

I claim:

In a gas griddle of the class described, the combination with a rectangular housing having front and side walls, of a griddle plate mounted in said housing with its front and side edges in contact with said walls, a burner tube underlying said plate with its air mixer and gas cock stem extending through and supported by said front wall, a panel mounted on the front of said housing, a control valve mounted in said panel through which gas is supplied to said burner tube, and a removable front cover member in hooked engagement with the top edge of said front wall of the housing and overlying and concealing the air mixer and gas cock stem.

JOHN BERGHOLM.